United States Patent
Xiong et al.

(10) Patent No.: US 9,527,757 B2
(45) Date of Patent: Dec. 27, 2016

(54) SUPERCAPACITOR DESALINATION CELLS, DEVICES AND METHODS

(75) Inventors: Rihua Xiong, Shanghai (CN); Wei Cai, Shanghai (CN); John Harold Barber, Fergus (CA); Chengqian Zhang, Shanghai (CN); Russell James MacDonald, Wilmington, MA (US); Keith James Sims, Wayland, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 75 days.

(21) Appl. No.: 14/117,388

(22) PCT Filed: May 22, 2012

(86) PCT No.: PCT/US2012/038963
§ 371 (c)(1),
(2), (4) Date: Nov. 13, 2013

(87) PCT Pub. No.: WO2012/166434
PCT Pub. Date: Dec. 6, 2012

(65) Prior Publication Data
US 2014/0339087 A1 Nov. 20, 2014

(30) Foreign Application Priority Data
May 31, 2011 (CN) .......................... 2011 1 0144233

(51) Int. Cl.
*C02F 1/469* (2006.01)
*C02F 103/08* (2006.01)
*C02F 101/10* (2006.01)

(52) U.S. Cl.
CPC ......... *C02F 1/4691* (2013.01); *C02F 2101/10* (2013.01); *C02F 2103/08* (2013.01);
(Continued)

(58) Field of Classification Search
CPC ..................................................... C02F 1/4691
See application file for complete search history.

(56) References Cited

U.S. PATENT DOCUMENTS 4,479,877 A * 10/1984 Guter .................... B01J 41/043
210/670
4,715,939 A 12/1987 Ball et al.
(Continued)

FOREIGN PATENT DOCUMENTS

CN 87102881 A 1/1988
EP 0757586 B1 6/2004
(Continued)

OTHER PUBLICATIONS

Lee et al, "Desalination of a Thermal Power Plant Wastewater by Membrane Capacitive Deionization," Desalination, 196(2004), pp. 125-134.*
(Continued)

*Primary Examiner* — Keith Hendricks
*Assistant Examiner* — Salil Jain
(74) *Attorney, Agent, or Firm* — GE Global Patent Operation

(57) ABSTRACT

A supercapacitor desalination cell comprises a first electrode, a second electrode, a spacer disposed between the first and second electrodes, and a monovalent ion selective layer disposed on at least one of the first and second electrodes. A supercapacitor desalination device and a method for desalination of a liquid are further presented.

9 Claims, 10 Drawing Sheets

(52) U.S. Cl.
CPC .... *C02F 2201/002* (2013.01); *C02F 2201/46* (2013.01); *C02F 2303/22* (2013.01)

(56) References Cited

U.S. PATENT DOCUMENTS

| | | | | |
|---|---|---|---|---|
| 5,376,250 | A * | 12/1994 | Hamano | B01D 61/44 204/529 |
| 6,258,276 | B1 * | 7/2001 | Mika | B01D 61/027 210/638 |
| 7,459,088 | B2 | 12/2008 | Davis | |
| 2004/0121204 | A1 * | 6/2004 | Adelman | C02F 1/4691 429/432 |
| 2008/0144256 | A1 | 6/2008 | Cai et al. | |
| 2008/0198531 | A1 * | 8/2008 | Shiue | C02F 1/46104 361/434 |
| 2009/0084675 | A1 * | 4/2009 | Lee | C02F 1/46109 204/294 |
| 2011/0024287 | A1 | 2/2011 | Zheng et al. | |
| 2011/0024354 | A1 * | 2/2011 | Xia | C02F 1/4604 210/648 |
| 2012/0217170 | A1 * | 8/2012 | Van Der Wal | C02F 1/4691 205/743 |

FOREIGN PATENT DOCUMENTS

| | | |
|---|---|---|
| EP | 2070583 | 6/2009 |
| JP | 8108184 | 4/1996 |
| WO | 2009123751 | 10/2009 |

OTHER PUBLICATIONS

Lee et al, "Desalination of a Thermal Plant Wastewater by Membrane Capacitive Deionization," Desalination, 196 (2006), 125-134.*

PCT Search Report and Written Opinion from corresponding PCT Application No. PCT/US2012/038963, Dated Sep. 11, 2012.

Lee et al. "Desalination of a Thermal Power Plant Wastewaters by Membrane Capacitive Deionization"Desolination, vol. 196, pp. 125-134, 2006.

Yuan, "Preparation of Selective Monovalent Caution Exchange Membrane and Preliminary Discussion on its Application", China's Outstanding Master's Thesis Project Technical Series, Sep. 30, 2009.

Unofficial English translation of Chinese Office Action issued in connection with corresponding CN Application No. 201110144233.5 on Aug. 5, 2013.

* cited by examiner

SUPERCAPACITOR DESALINATION CELLS, DEVICES AND METHODS

BACKGROUND

This invention relates generally to supercapacitor desalination (SCD) cells, devices and methods. More particularly, this invention relates to supercapacitor desalination cells, devices and methods using ion selective layers.

SCD devices generally refer to supercapacitors that are employed for desalination of seawater or deionization of other brackish waters to reduce the amount of salt to a permissible level for domestic and industrial use. Generally, a supercapacitor desalination cell has a double layer construction, in which a pair of electrodes typically comprising particulate activated carbon or other conductive high surface area materials are separated by a spacer. The structure of the typical supercapacitor cell further comprises electrically conductive current collector elements in intimate contact with the respective electrodes.

In certain applications, the supercapacitor desalination cells employ a plurality of ion selective layers in intimate contact with respective electrodes to facilitate adsorption and desorption of cations and anions in electrolytes to and from the electrodes when such supercapacitor desalination cells are in charging and discharging states, respectively. However, in current applications, the ion selective layers have more selectivity for polyvalent ions than to monovalent ions since the polyvalent ions generally have higher polarities than those of the monovalent ions, which is disadvantageous for removal of the monovalent ions.

Additionally, when calcium cations and magnesium cations are selectively removed, divalent ions are preferentially attracted to the electrodes via the respective ion selective layers causing high concentrations of $Ca^{2+}$ and $Mg^{2+}$, and high concentrations of $SO_4^{2-}$ and $CO_3^{2-}$ at respective electrodes. This causes decrease of pH values in surfaces of cathodes, such as carbon cathodes during charging resulting in scale formation within the electrodes, and/or between the electrodes and the ion selective layers.

Therefore, there is a need for new and improved supercapacitor desalination cells, devices and methods equipped with ion selective layers for removal of one or more monovalent ions and avoiding scale formation within the supercapacitor desalination cells and devices.

BRIEF DESCRIPTION

A supercapacitor desalination cell is provided in accordance with one embodiment of the invention. The supercapacitor desalination cell comprises a first electrode, a second electrode, a spacer disposed between the first and second electrodes, and a monovalent ion selective layer disposed on at least one of the first and second electrodes.

A supercapacitor desalination device is provided in accordance with another embodiment of the invention. The supercapacitor desalination device comprises one or more supercapacitor desalination stacks in fluid communication with each other in series and one or more insulating separators disposed between each pair of adjacent supercapacitor desalination cells. At least one of the one or more supercapacitor desalination stacks comprises a plurality of supercapacitor desalination cells stacked together and at least one of the supercapacitor desalination cells comprises a first electrode, a second electrode, a spacer disposed between the first and second electrodes, and a monovalent ion selective layer disposed on at least one of the first and second electrodes.

Another aspect of the invention provides a supercapacitor desalination device. The supercapacitor desalination device comprises one or more supercapacitor desalination stacks in fluid communication with each other in series. At least one of the one or more supercapacitor desalination stacks comprises a first electrode, a second electrode, one or more bipolar electrodes disposed between the first and second electrodes, and one or more spacers disposed between each pair of adjacent electrodes. The at least one of the one or more supercapacitor desalination stacks further comprises a monovalent ion selective layer disposed on at least one of the first electrode, the second electrode and the one or more bipolar electrodes.

A method for desalination of a liquid is further provided in accordance yet another embodiment of the invention. The method comprises providing a supercapacitor desalination apparatus and passing the liquid through the desalination apparatus for desalination. The supercapacitor desalination apparatus comprises a first electrode, a second electrode, a spacer disposed between the first and second electrodes, and a monovalent ion selective layer disposed on at least one of the first and second electrodes.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION OF THE INVENTION

Embodiments of the present disclosure are described herein with reference to the accompanying drawings. In the subsequent description, well-known functions or constructions are not described in detail to avoid obscuring the disclosure in unnecessary detail.

Figure 1:
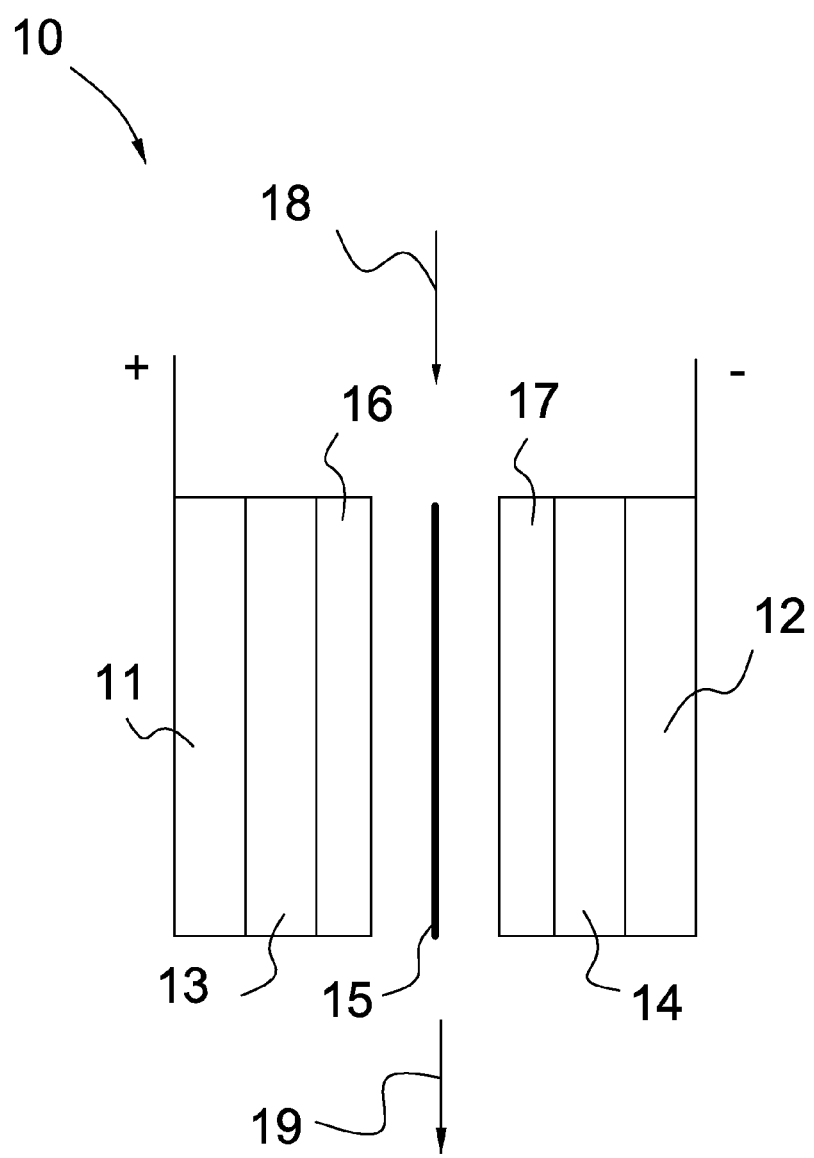
FIGS. 1-3 are schematic diagrams of a SCD cell in accordance with various embodiments of the invention.

FIG. 1 illustrates a schematic diagram of a SCD cell (or apparatus) 10 in accordance with one embodiment of the invention. As depicted in FIG. 1, the SCD cell 10 comprises a first current collector 11, a second current collector 12, a first electrode 13, a second electrode 14, a spacer 15, a monovalent anion selective layer 16 and a monovalent cation selective layer 17. The first and second electrodes 13 and 14 are in intimate contact with the first and second current collectors 11 and 12, respectively. The spacer 15 is disposed between the monovalent anion selective layer 16 and the monovalent cation selective layer 17.

In some examples, the first current collector 11 may be connected to a positive terminal of a power source (not shown), and the second current collector 12 may be connected to a negative terminal of the power source, so that the first electrode 13 may act as a positive electrode (anode) and the second electrode 14 may act as a negative electrode (cathode). Accordingly, for the illustrated arrangement, the monovalent anion selective layer 16 is in intimate contact with the anode 13 and the monovalent cation selective layer 17 is intimate contact with the cathode 14.

It should be noted that the arrangement in FIG. 1 is merely illustrative. In other examples, the first electrode 13 and the second electrode 14 may act as a cathode and an anode respectively, so that the monovalent anion selective layer 16 and the monovalent cation selective layer 17 are disposed on the anode 14 and the cathode 13, respectively. Although illustrated separately in FIG. 1, in some applications, the first electrode 13 and the monovalent anion selective layer 16, and the second electrode 14 and the monovalent cation selective layer 17 may be integrated together respectively to act as a cathode and an anode.

In certain applications, the first current collector 11 and/or the second current collector 12 may not be employed, so that the first electrode 13 and/or the second electrode 14 may be connected to a power source, and function as both electrodes and current collectors. Additionally, as used herein, the term "layer" may not indicate a particular thickness of the material.

For some arrangements, the current collectors 11 and 12 may be configured as a plate, a mesh, a foil, or a sheet and formed from a metal or metal alloy. Non-limiting examples of the metal include titanium, platinum, iridium, or rhodium. In one example, the metal alloy includes stainless steel. In other examples, the current collectors 11 and 12 may comprise graphite or a plastic material, such as a polyolefin. Additionally, the plastic current collectors 11 and 12 may be mixed with conductive carbon blacks or metallic particles to achieve a certain level of conductivity.

The first and second electrodes 13, 14 may be in the form of plates that are disposed parallel to each other to form a stacked structure. Alternatively, the electrodes 13, 14 may have varied shapes, such as a sheet, a block, or a cylinder, and may be arranged in varying configurations. For example, the first and second electrodes may be disposed concentrically with a spiral and continuous space therebetween.

The first and second electrodes 13, 14 may include electrically conductive materials, which may or may not be thermally conductive, and may have particles with smaller sizes and large surface areas. In some examples, the electrically conductive material may include one or more carbon materials. Non-limiting examples of the carbon materials include activated carbon particles, porous carbon particles, carbon fibers, carbon aerogels, porous mesocarbon microbeads, or combinations thereof. In other examples, the electrically conductive materials may include a conductive composite, such as oxides of manganese, or iron, or both, or carbides of titanium, zirconium, vanadium, tungsten, or combinations thereof. In some applications, the electrodes 13 and 14 may be deposited on the current collectors 11 and 12 by employing one or more deposition techniques, such as sputtering, spraying, spin-coating, calendering or printing.

The spacer 15 may comprise any ion-permeable, electronically nonconductive material to separate the first electrode 13 and the second electrode 14. In non-limiting examples, the spacer 15 may have or themselves may be spaces to form flow channels through which a liquid passes between the first electrode 13 and the second electrode 14.

In embodiments of the invention, the monovalent anion selective layer 16 may be configured to produce a monovalent anion conductive transporting pathway to and from the electrode 13. The monovalent cation selective layer 17 may be configured to produce a monovalent cation conductive transporting pathway to and from the electrode 14. Accordingly, during charging and discharging cycles, a relatively small amount of energy may be consumed to adsorb and dissociate monovalent anions and cations in a fluid (an electrolyte) to and from respective surfaces of the first and second electrodes 13, 14.

In non-limiting examples, the monovalent anion selective layer 16 and/or the monovalent cation selective layer 17 may be freestanding to be disposed on the respective electrodes 13, 14. Alternatively, the monovalent anion selective layer 16 and/or the monovalent cation selective layer 17 may be coated on the surfaces of the respective electrodes 13, 14 in the form of membranes. In certain applications, the monovalent anion selective layer 16 and/or the monovalent cation selective layer 17 may disperse into the respective electrodes 13, 14.

In non-limiting examples, suitable materials for use in the monovalent anion selective layer 16 may include crosslinked copolymers derived from vinylbenzylchloride (VBC), dibutyl amine (DBA), tributyl amine (TBA), and divinylbenzene (DVB). In one example, during making the monovalent anion selective layer 16, the monomer of the vinylbenzylchloride (110.3 g, 0.701 mol), the monomer of the dibutyl amine (86.3 g, 0.484 mol) and the monomer of tributyl amine (117.7 g, 0.629 mol) are mixed while the divinylbenzene (86.3 g), propylene glycol (PG) (92.5 g), and methylhydroquione (MEHQ) (500 ppm) are added therein as a crosslinker, a solvent, and an inhibitor respectively for reaction at a temperature of about 65° C.-70° C. for about 3 hours to form a reaction mixture. Subsequently, a tert-Butyl peroxy-2-ethylhexanoate (2 wt %) solution is added into the reaction mixture as an initiator to form a mixture. Then, the mixture is coated on a surface of the electrode and polymerized at about 85° C. for about 1 hour to form the monovalent anion selective layer 16 on the electrode.

Suitable materials for use in the monovalent cation selective layer 17 may include crosslinked copolymers derived from acrylamidomethylpropane sulfonic acid (AMPS) and ethylene glycol dimethacrylate (EGDMA). In one example, during making the monovalent cation selective layer 17, the monomer of the acrylamidomethylpropane sulfonic acid (380 g, 1.84 moles) and a crosslinker of the ethylene glycol dimethacrylate (360 g, 1.82 moles) are mixed with vinylbenzyl chloride (VBC) or glycidyl methacrylate (GMA) (5 wt %) in the presence of a solvent of n-methylpyrrolidone to form a first mixture. Subsequently, the first mixture is added with an initiator of a tert-Butyl peroxy-2-ethylhexanoate (1.5 wt %) solution to form a second mixture. Then, the second mixture is coated on a surface of the electrode and polymerized at a temperature of about 85° C. for about 1 hour to form the copolymer on the electrode. Next, the electrode 14 coated with the copolymer is soaked in a polyethyleneimine (PEI) (1 wt %) solution at a temperature about 60° C. for about 5-10 hours to form the monovalent cation selective layer 17 on the electrode.

As illustrated in FIG. 1, an input liquid 18 passes through between the first electrode 13 and the second electrode 14. In some examples, the input liquid 18 may have charged species including monovalent and polyvalent charged ions. During a charging state, the monovalent cations move towards the cathode 14 through the monovalent cation selective layer 17 and the monovalent anions move towards the anode 13 through the monovalent anion selective layer 16. The polyvalent charged ions remain in the input liquid 18 since the monovalent ion selective layers 16, 17 are impassable for the polyvalent charged ions. As a result of the charge accumulation inside the SCD cell 10, an output liquid 19, which is a dilute liquid from the SCD cell 10, has a lower concentration of the monovalent charged species as compared to the input liquid 18.

During a discharging state, the adsorbed monovalent ions dissociate from the respective surfaces of the electrodes 13 and 14. In certain applications, in this state, the polarity of the first and second electrodes 13 and 14 are reversed, so that the monovalent ions adsorbed in the charging state move towards the opposite electrodes. As a result, an output stream (not shown) may have a higher concentration of the monovalent charged species compared to an input stream (not shown).

Accordingly, in the illustrated example, due to the presence of the monovalent ion selective layers 16, 17, the monovalent ions are removed from the input liquid 18 with lower energy consumption and the polyvalent ions remain in the output liquid 19 based on certain applications. For example, the arrangement shown in FIG. 1 may be employed to produce monovalent salts, such as sodium chloride salts.

In some embodiments, only one of the monovalent anion selective layer 16 and the monovalent cation selective layer 17 is employed. In this case, an ion selective layer may be provided within a SCD cell to be paired with the respective one of the monovalent ion selective layers 16, 17. As used herein, the term "ion selective layer" may indicate an ion selective layer configured to be passable for not only the monovalent ions but also the polyvalent ions.

Figure 2:
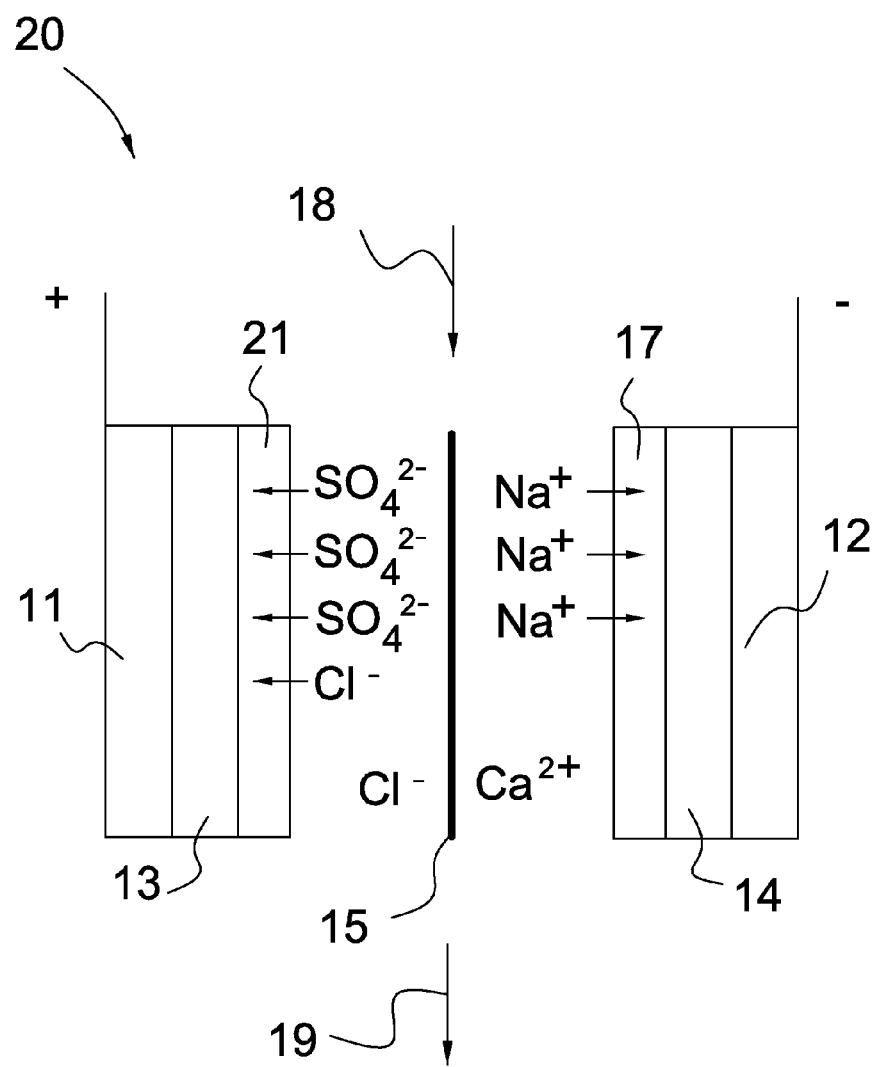

FIG. 2 is a schematic diagram of a SCD cell 20 in accordance with another embodiment of the invention. It should be noted that the arrangements in FIGS. 2-10 are merely illustrative. The same numerals in FIGS. 2-10 may indicate similar elements.

Figure 3:
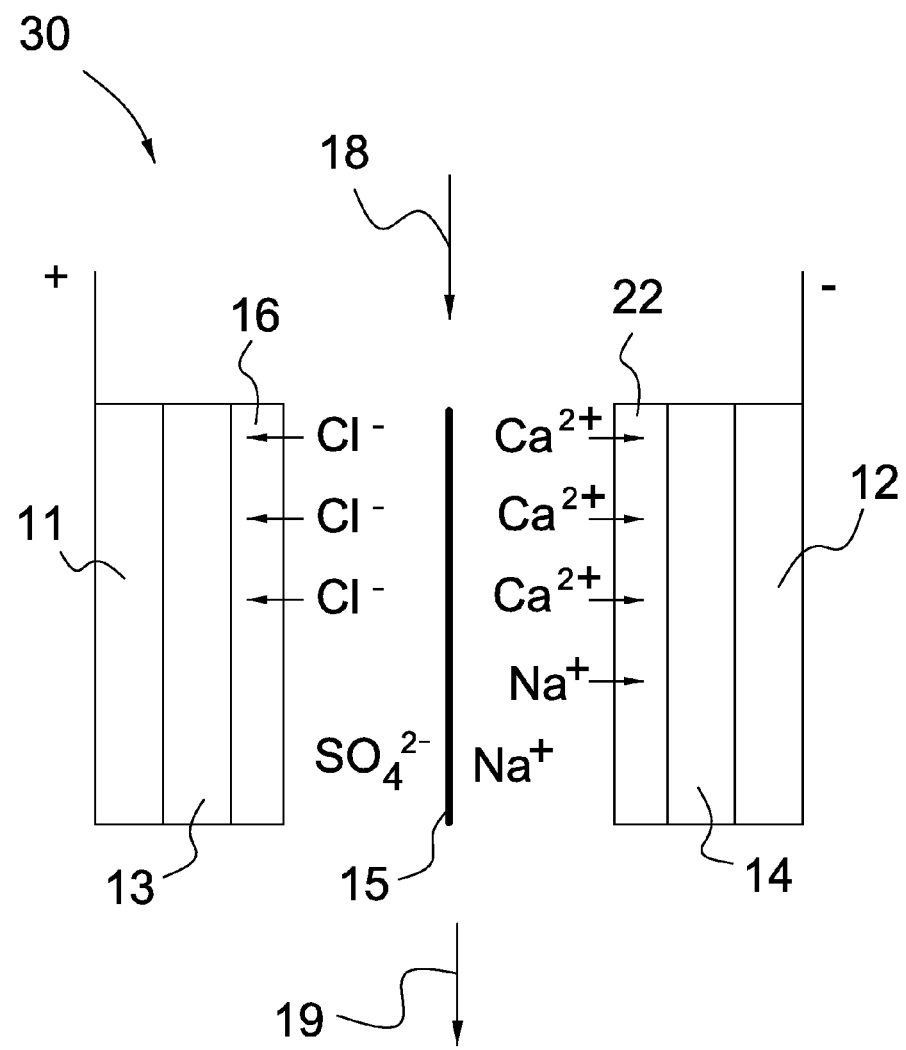

As illustrated in FIG. 2, the arrangement is similar to the arrangement in FIG. 1. The two arrangements differ in that the SCD cell 20 in FIG. 2 include an anion selective layer 21 to be paired with a monovalent cation selective layer 17 for desalination of a liquid. Alternatively, as illustrated in FIG. 3, a SCD cell 30 comprises a cation selective layer 22 employed to be paired with a monovalent anion selective layer 16 thereof for desalination of a liquid.

In some examples, the anion selective layer 21 may indicate an ion selective layer configured to be passable for not only the monovalent anions but also the polyvalent anions. The cation selective layer 22 may indicate an ion selective layer configured to be passable for not only the monovalent cations but also the polyvalent cations. In certain applications, the ion selective layers 21, 22 may have higher selectivity for the polyvalent ions than for the monovalent ions. In non-limiting examples, the anion selective layer 21 and the cation selective layer 22 may be polyvalent ion selective layers.

For certain arrangements, suitable materials for the anion selective layer 21 may include an ionic polymer including a cation group, such as a quaternary amine group, for transmission of the anions. The cation selective layer 22 may comprise an ionic polymer including an anion group, such as a carboxylic acid group ($COO^-$) group, for transmission of the cations. Other descriptions of the suitable materials for the anion and cation selective layers can be found in a patent application of EP 0757586 B1, which is hereby incorporated by reference.

For the illustrated arrangement in FIG. 2, during a charging state, when an input liquid 18 passes through between the first electrode 13 and the second electrode 14, at least a portion of the monovalent cations in the input liquid 18 pass through the monovalent cation selective layer 17 to accumulate on the electrode 14. A larger portion of the polyvalent anions and a small portion of the monovalent anions in the input liquid 18 pass through the anion selective layer 21 to accumulate on the electrode 13. Due to the presence of the monovalent cation selective layer 17, the polyvalent cations may remain in an output liquid 19.

Similarly, for the illustrated arrangement in FIG. 3, during a charging state, at least a portion of the monovalent anions in the input liquid 18 pass through the monovalent anion selective layer 16 to accumulate on the electrode 13. A larger portion of the polyvalent cations and a small portion of the monovalent cations pass through the cation selective layer 22 to accumulate on the electrode 14. Due to the presence of the monovalent anion selective layer 16, the polyvalent cations remain in an output liquid 19.

For example, for the arrangement in FIG. 2, the input liquid 18, which contains the charged ions including, but not limited to $SO_4^{2-}$, $Ca^{2+}$, $Na^+$ and $Cl^-$, passes through the SCD cell 20. The anion selective layer 21 has higher selectivity for the polyvalent anions, so that a larger portion of $SO_4^{2-}$ ions and a small portion of $Cl^-$ ions pass through the anion selective layer 21 for adsorption to the electrode 13. Meanwhile, due to the presence of the monovalent cation selective layer 17, at least a portion of $Na^+$ ions are adsorbed to the electrode 14. Thus, a larger portion of $SO_4^{2-}$ ions are removed from the input liquid 18 without precipitating the less soluble salts, such as $CaSO_4$, and $Ca^{2+}$ ions and/or a portion of $Cl^-$ ions may remain in the output liquid 19.

Similarly, for the arrangement in FIG. 3, when the input liquid 18 passes through the SCD cell 30, the cation selective layer 22 has higher selectivity for the polyvalent cations, so that a larger portion of $Ca^{2+}$ ions, a small portion of $Na^+$ ions are removed from the input liquid 18. Meanwhile, due to the monovalent anion layer 16, at least a portion of $Cl^-$ ions are also removed. The $SO_4^{2-}$ ions and/or a portion of $Na^+$ ions may remain in the output liquid 19. Thus, for the illustrated arrangements in FIGS. 2-3, scale formation may be alleviated or avoided in the SCD cells.

In some applications, more than one SCD cell may be provided in series, so that an output liquid from a SCD cell may be reintroduced into a next SCD cell for further desalination, and for such arrangements, the SCD cells having the same or different configurations.

Figure 4:
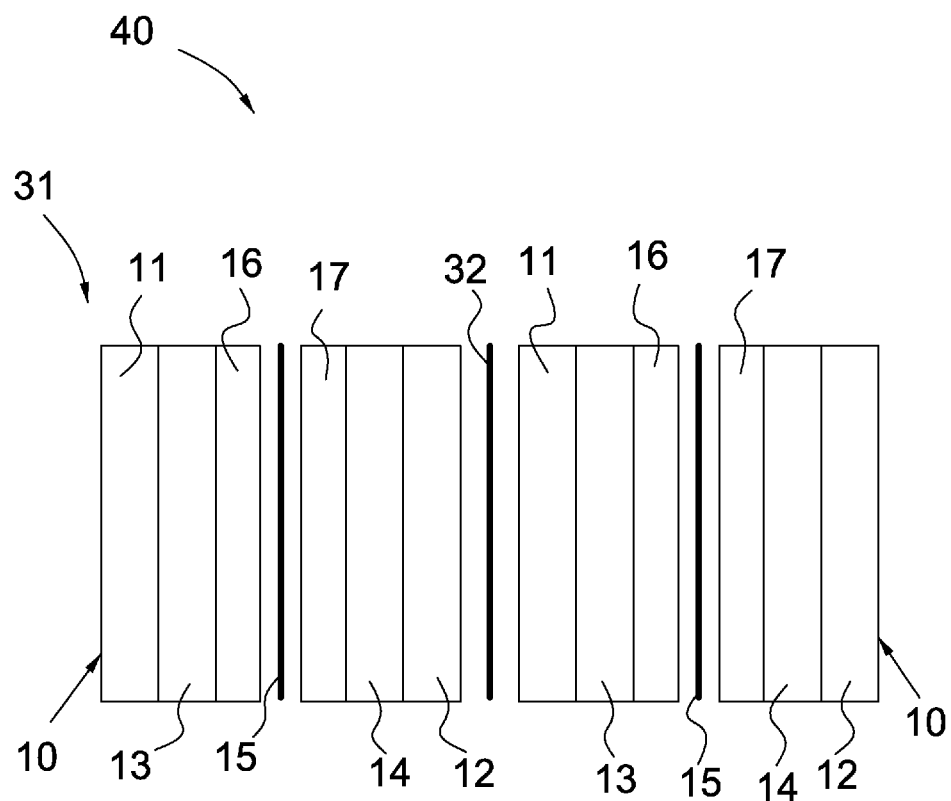
FIGS. 4-9 are schematic diagrams of a SCD device in accordance with various embodiments of the invention.

FIGS. 4-9 illustrate schematic diagrams of a SCD device in accordance with various embodiments of the invention. As depicted in FIG. 4, a SCD device 40 comprises a SCD stack 31. The SCD stack 31 comprises a plurality of the SCD cells 10 configured in parallel so as to be stacked together with one or more insulating separators 32 disposed between each pair of adjacent stacked SCD cells 10.

Figure 5:
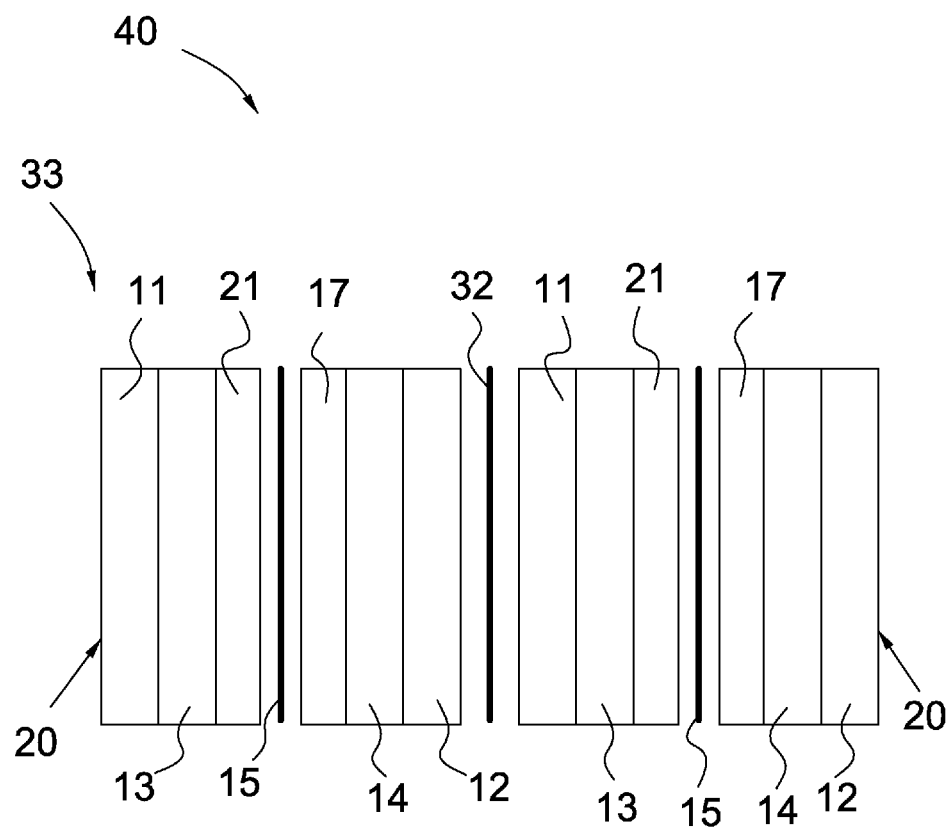
Figure 6:
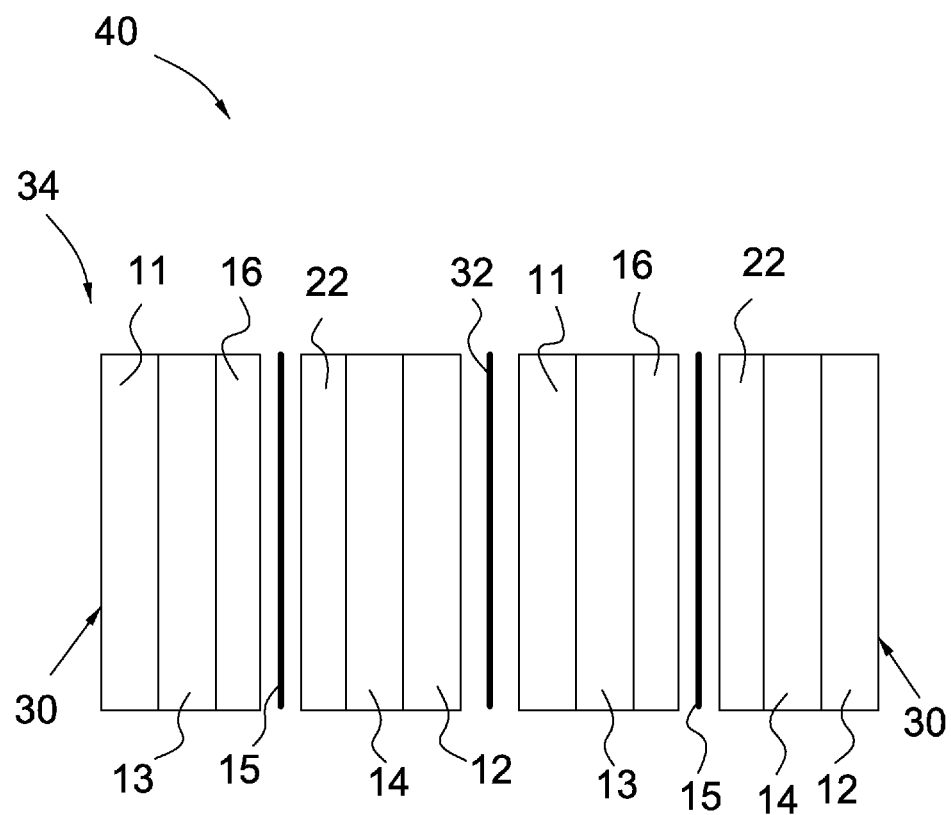
Figure 7:
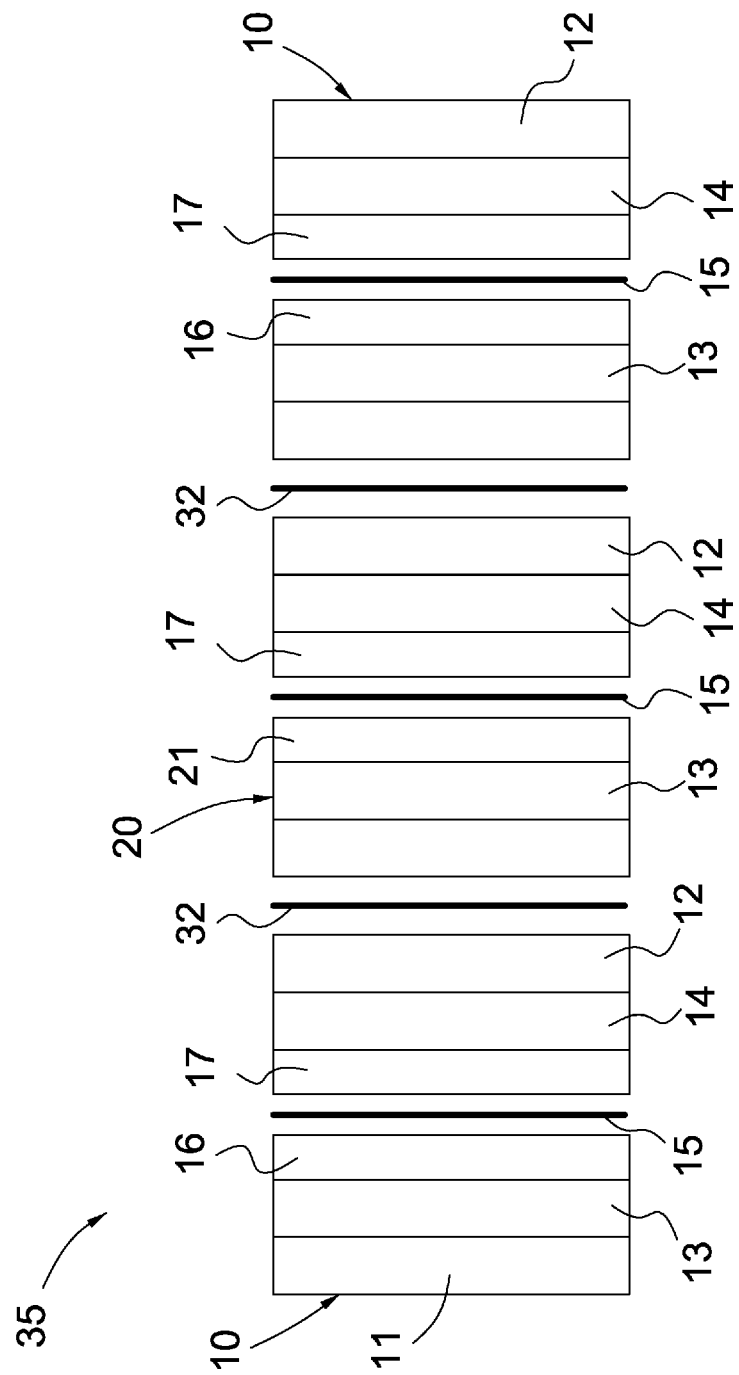

The arrangements in FIGS. 5-7 are similar to the arrangement show in FIG. 4 and the arrangements in FIGS. 4-7 differ in that a SCD stack 33 in FIG. 5 comprises a plurality of SCD cells 20 stacked together with one or more insulating separators 32 disposed between each pair of adjacent stacked SCD cells 20. A SCD stack 34 in FIG. 6 comprises a plurality of SCD cells 30 stacked together with one or more insulating separators 32 disposed between each pair of adjacent stacked SCD cells 30.

Figure 8:
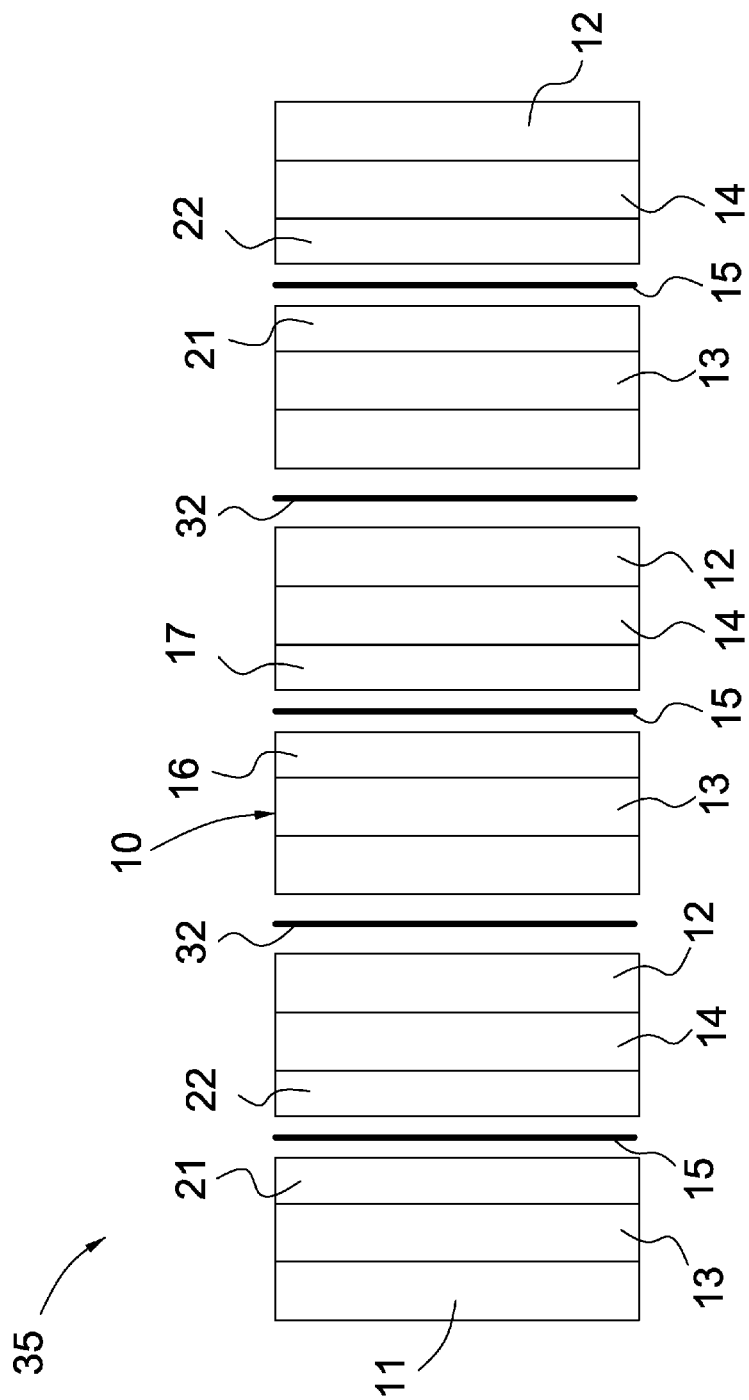

As depicted in FIG. 7, a stack 35 comprises a pair of the SCD cells 10 and one SCD cell 20 stacked together with a plurality of insulating separators 32 disposed therebetween. It should be noted that the arrangement in FIG. 7 is merely illustrative. In some applications, the SCD stack 35 may comprise two or more of one or more SCD cells 10, one or more SCD cells 20, and one or more SCD cells 30 stacked together. In certain applications, the SCD stack 35 may comprise one or more SCD cells each comprising the cation selective layers 21 and the anion selective layers 22, and one or more of the one or more SCD cells 10, the one or more SCD cells 20 and the one or more SCD cells 30. For example, as illustrated in FIG. 8, the SCD stack 35 comprises one SCD cell 10 disposed between two SCD cells each comprising the cation selective layers 21 and the anion selective layers 22.

Figure 9:
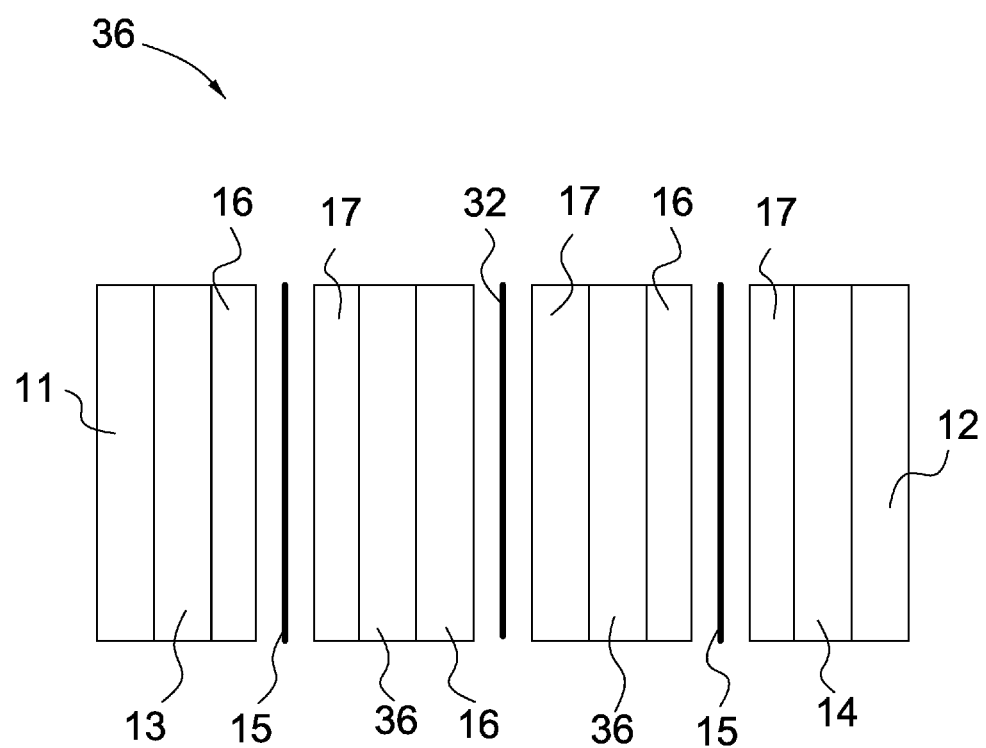

Thus, the arrangements shown in FIGS. 4-8 may be used for desalination of a large amount of the input liquid based on different applications. In other examples, as illustrated in FIG. 9, similar to the arrangements in FIGS. 4-8, a SCD stack 36 may be provided and comprise first and second electrodes 13, 14, a pair of current collectors 11, 12 attached to the respective electrodes 13, 14, one or more bipolar electrodes 37 disposed between the pair of electrodes, and a plurality of spacers 15 disposed between each of the pairs of adjacent electrodes. Each bipolar electrode has a positive side and a negative side, separated by an ion-impermeable layer. A plurality of the monovalent selective layers 16, 17 disposed on the first electrode 13, the second electrodes 14 and/or one or two surfaces of at least one of the one or more bipolar electrodes 37. In certain applications, one or more of the monovalent anion layers 16 or one or more of the monovalent cation layers 17 may not be employed. One or more of the anion selective layers 21 and/or one or more of the cation selective layers 22 may be employed. Additionally, one or more bipolar electrodes may be employed in the one or more arrangements shown in FIGS. 4-8.

In some examples, the one or more bipolar electrodes may not be limited to any particular bipolar electrodes. In non-limiting examples, other descriptions of the bipolar electrode can be found in a publication application of US/20110024287, which has the same assignee as this application and the contents of which are hereby incorporated by reference.

For some arrangements, the SCD device 40 may comprise more than one SCD stacks disposed in series, so that an output liquid from one SCD stack (a first SCD stack) may be reintroduced into a next SCD stack (a second stack) for further desalination. In some examples, the SCD device 40 may comprise a plurality of the same SCD stacks disposed in series. In other examples, the SCD device 40 may comprise a plurality of the SCD stacks disposed in series and having different configurations. For example, the SCD device 40 may comprise two or more of the one or more SCD stacks 31, the one or more SCD stacks 33, the one or more SCD stacks 34, the one or more SCD stacks 35 and the one or more SCD stacks 36, which are in fluid communication in series.

Figure 10:
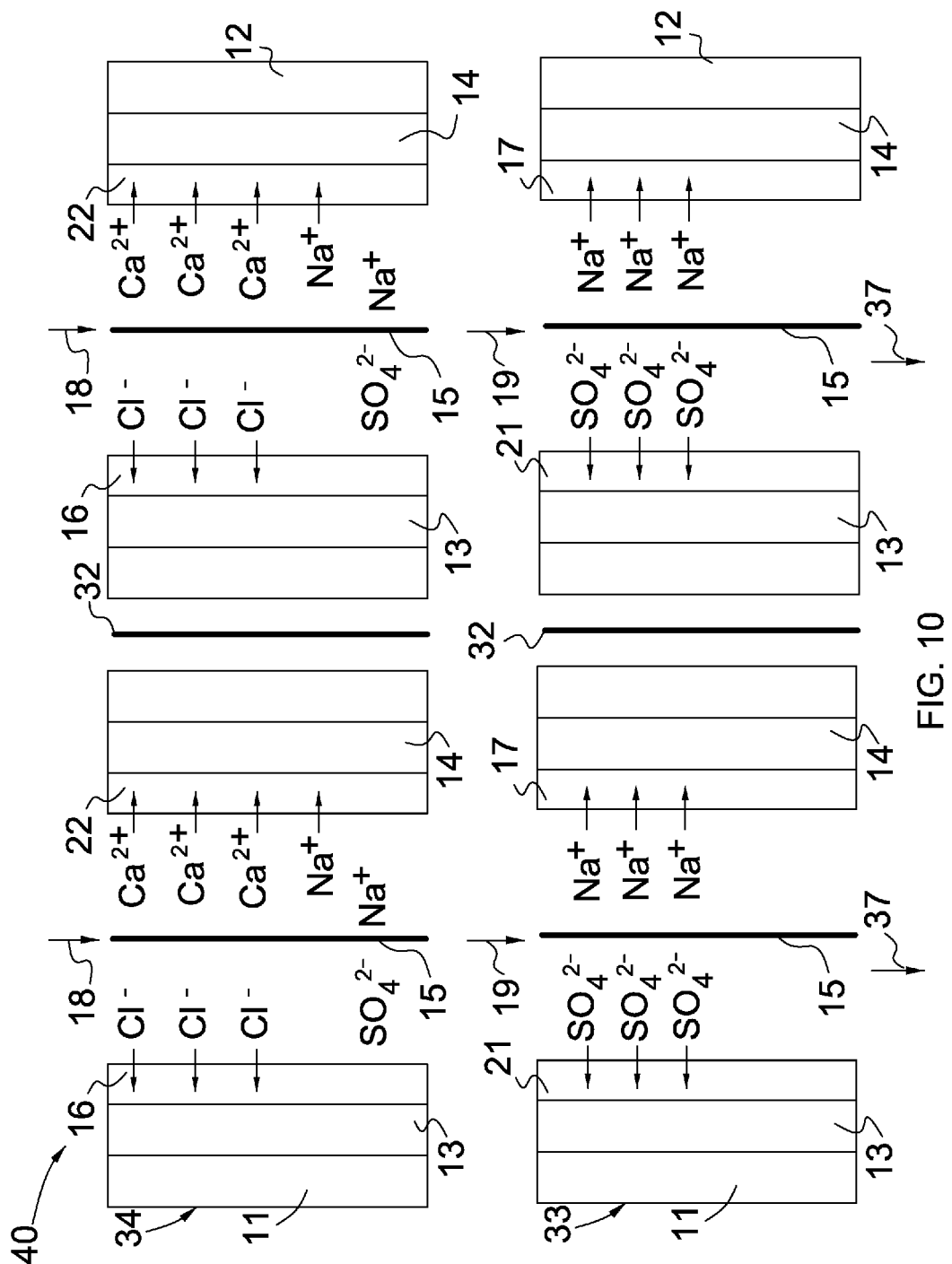
FIG. 10 is a schematic diagram of the SCD device in accordance with one embodiment of the invention.

In one non-limiting example, as depicted in FIG. 10, the SCD device 40 comprises the SCD stacks 34 and 33 in fluid communication with each other. Thus, during a charging state, when an input liquid 18 passes through the SCD stack (a first SCD stack) 34, which contains charged ions including, but not limited to $SO_4^{2-}$, $Ca^{2+}$, $Na^+$ and $Cl^-$, a larger portion of $Ca^{2+}$ ions, a small portion of $Na^+$ ions, and at least a portion of $Cl^-$ ions are removed, so that the output liquid 19 has lower concentration of the $Ca^{2+}$, $Na^+$ and $Cl^-$ ions compared to the input liquid 18. The $SO_4^{2-}$ ions remain in an output liquid 19.

Subsequently, the output liquid 19 is introduced into the SCD stack (a second SCD stack) 33, the residual $Na^+$ ions and the $SO_4^{2-}$ ions are accumulated on the surfaces of the respective electrodes so as to be removed from the output liquid 19 to produce a product stream 38. In certain applications, the output liquid 19 may be recirculated into the SCD stack 34 for further desalination before being reintroduced into the SCD stack 33 and/or the product stream 38 may be recirculated into the SCD stack 33 for further desalination.

During a discharging state, when two input streams (not shown) are introduced into the SCD stacks 34 and 33 respectively, a first output stream from the SCD stack 34 may have a higher concentration of $Ca^{2+}$ and $Cl^-$ ions, and a second output stream from the SCD stack 33 may have higher concentrations of the $SO4^{2+}$ and $Na^+$ ions.

Accordingly, in embodiments of the invention, the SCD device 40 may be employed to desalinate a larger amount of the input liquid 18 and selectively remove the polyvalent and monovalent ions. Compared with conventional SCD devices, a relatively low energy may be consumed and precipitation of the less soluble salts may be avoided so as to alleviate and/or avoid scale formation.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be through the spirit and scope of the disclosure as defined by the subsequent claims.

What is claimed is:

1. A supercapacitor desalination device, comprising:
   a supercapacitor desalination stack, the supercapacitor desalination stack comprising:
   a plurality of supercapacitor desalination cells stacked together, at least one of the plurality of supercapacitor desalination cells comprising:
   a first electrode,
   a second electrode,
   a spacer disposed between the first and second electrodes, and
   a monovalent ion selective layer disposed on at least one of the first and second electrodes, wherein the monovalent ion selective layer comprises:
   a copolymer derived from vinylbenzylchloride, dibutyl amine, tributyl amine and divinylbenzene or a copolymer derived from acrylamidomethylpropane sulfonic acid and ethylene glycol dimethacrylate; and
   one or more insulating separators disposed between each pair of adjacent supercapacitor desalination cells.

2. The supercapacitor desalination device of claim 1, wherein the at least one of the plurality of supercapacitor desalination cells further comprises a first current collector configured to contact the first electrode and a second current collector configured to contact the second electrode.

3. The supercapacitor desalination device of claim 2, wherein a monovalent anion selective layer is disposed on the first electrode and a monovalent cation selective layer is disposed on the second electrode.

4. The supercapacitor desalination device of claim 2, wherein the monovalent ion selective layer is disposed on one of the first and second electrodes, and an ion selective layer is disposed on the other one of the first and second electrodes to be paired with the monovalent ion selective layer.

5. The supercapacitor desalination device of claim 4, wherein the ion selective layer comprises a cation selective layer and wherein the monovalent ion selective layer comprises a monovalent anion selective layer.

6. The supercapacitor desalination device of claim 4, wherein the ion selective layer comprises an anion selective layer and wherein the monovalent ion selective layer comprises a monovalent cation selective layer.

7. A supercapacitor desalination device comprising two or more supercapacitor desalination stacks in fluid communication with each other in series, at least one of the two or more supercapacitor desalination stacks comprising:
- a first electrode;
- a second electrode;
- one or more bipolar electrodes disposed between the first and second electrodes;
- a monovalent ion selective layer disposed on at least one of the first electrode, the second electrode and the one or more bipolar electrodes, wherein the monovalent ion selective layer comprises: a copolymer derived from vinylbenzylchloride, dibutyl amine, tributyl amine and divinylbenzene or a copolymer derived from acrylramidomethylpropane sulfonic acid and ethylene glycol dimethacrylate; and
- one or more spacers disposed between each pair of adjacent electrodes.

8. The supercapacitor desalination device of claim 1, wherein at least one of the other supercapacitor desalination cells of the plurality of the supercapacitor desalination cells comprises:
- a third electrode;
- a fourth electrode; and
- a cation selective layer disposed on the third electrode and an anion selective layer disposed on the fourth electrode with a spacer disposed between the cation and anion selective layers.

9. The supercapacitor desalination device of claim 1, wherein the supercapacitor desalination device comprises a plurality of stacks, which are in fluid communication with each other in series.

* * * * *